(12) United States Patent
Shigaki et al.

(10) Patent No.: US 11,083,990 B2
(45) Date of Patent: Aug. 10, 2021

(54) GAS SEPARATION AND RECOVERY METHOD AND FACILITY

(71) Applicant: JFE Steel Corporation, Tokyo (JP)

(72) Inventors: Nobuyuki Shigaki, Tokyo (JP); Yasuhiro Mogi, Tokyo (JP); Takashi Haraoka, Tokyo (JP); Ikuhiro Sumi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 211 days.

(21) Appl. No.: 16/478,562

(22) PCT Filed: Dec. 6, 2017

(86) PCT No.: PCT/JP2017/043776
§ 371 (c)(1),
(2) Date: Jul. 17, 2019

(87) PCT Pub. No.: WO2018/135164
PCT Pub. Date: Jul. 26, 2018

(65) Prior Publication Data
US 2020/0047108 A1    Feb. 13, 2020

(30) Foreign Application Priority Data

Jan. 19, 2017  (JP) .............................. JP2017-007133

(51) Int. Cl.
*B01D 53/02*    (2006.01)
*B01D 53/04*    (2006.01)
*B01D 53/047*   (2006.01)

(52) U.S. Cl.
CPC ........... *B01D 53/047* (2013.01); *B01D 53/02* (2013.01); *B01D 53/0446* (2013.01);
(Continued)

(58) Field of Classification Search
CPC ... B01D 53/02; B01D 53/047; B01D 53/0446
See application file for complete search history.

(56) References Cited

U.S. PATENT DOCUMENTS

| 4,468,238 A | 8/1984 | Matsui et al. |
| 8,192,527 B2* | 6/2012 | Pirngruber ................ C01B 3/56 95/97 |

(Continued)

FOREIGN PATENT DOCUMENTS

| CN | 1101589 A | 4/1995 |
| CN | 1503687 A | 6/2004 |

(Continued)

OTHER PUBLICATIONS

Heymans, N., et al., "Experimental and theoretical study of the adsorption of pure molecules and binary systems containing methane, carbon monoxide, carbon dioxide and nitrogen. Application to the syngas generation," 2011, pp. 3850-3858, vol. 66, Chemical Engineering Science.

(Continued)

*Primary Examiner* — Robert A Hopkins
(74) *Attorney, Agent, or Firm* — RatnerPrestia (57) ABSTRACT

A gas separation and recovery method is provided. Based on the fact that a gas adsorbent has differing adsorption and desorption characteristics depending on the affinities and pressures of gas species, and gases of different species are desorbed at different timings, a target gas component is separated and recovered from a source gas by a pressure swing adsorption process in such a manner that a desorption step is divided into, for example, two time periods and desorbed gases are recovered separately in the respective time periods. In this manner, when gas 1 and gas 2 having different desorption timings are adsorbed to an adsorbent, a gas rich in gas 1, and a gas rich in gas 2 may be recovered separately from each other. Thus, it becomes possible to separate and recover selectively a target gas component with high concentration.

19 Claims, 6 Drawing Sheets

(52) U.S. Cl.
CPC .. *B01D 2253/108* (2013.01); *B01D 2257/504* (2013.01); *B01D 2259/40056* (2013.01)

(56) References Cited

U.S. PATENT DOCUMENTS

| | | | |
|---|---|---|---|
| 2011/0005389 A1 | 1/2011 | Webley et al. | |
| 2016/0051923 A1 | 2/2016 | Henderson et al. | |

FOREIGN PATENT DOCUMENTS

| | | | | |
|---|---|---|---|---|
| CN | 103596661 A | 2/2014 | | |
| CN | 103796731 A | 5/2014 | | |
| CN | 105132060 A | 12/2015 | | |
| CN | 209065415 U | * 7/2019 | ............. | C01B 13/02 |
| EP | 0201235 A2 | 11/1986 | | |
| EP | 0641591 A1 | 3/1995 | | |
| EP | 1380335 A1 | 1/2004 | | |
| EP | 2253915 A1 | 11/2010 | | |
| EP | 2719437 A1 | 1/2014 | | |
| EP | 2752232 A1 | 7/2014 | | |
| JP | 49131965 A | 12/1974 | | |
| JP | 61242908 A | 10/1986 | | |
| JP | 61254218 A | 11/1986 | | |
| JP | 02283608 A | 11/1990 | | |
| JP | 06144818 A | 5/1994 | | |
| JP | 07136444 A | 5/1995 | | |
| JP | 2006043589 A | 2/2006 | | |
| JP | 2016043355 A | 4/2016 | | |
| KR | 19880000513 B1 | 4/1988 | | |
| WO | 2016164963 A1 | 10/2016 | | |

OTHER PUBLICATIONS

Pour, A.A., "Adsportion separation of $CO_2/CH_4$ on the synthesized NaA zeolite shaped with montmoriollonite clay in natural gas purification process," 2016, pp. 630-643, vol. 36, Journal of Natural Gas Science and Engineering.
Korean Office Action for Korean Application No. 10-2019-7023881, dated Nov. 9, 2020 with Concise Statement of Relevance of Office Action, 9 pages.
European Communication pursuant to Article 94(3) for European Application No. 17 892 777.8, dated Jul. 9, 2020, 5 pages.
Extended European Search Report for European Application No. 17 892 777.8, dated Dec. 2, 2019, 9 pages.
International Search Report and Written Opinion for International Application No. PCT/JP2017/043776, dated Feb. 26, 2018—6 pages.
Ma, "Air Pollution Control Engineering" Second Edition, China Environmental Science Press, 2004, 2 pages.
Chinese Office Action for Chinese Application No. 201780083910.2, dated Mar. 24, 2021 with Concise Statement of Relevance of Office Action, 16 pages.

* cited by examiner

GAS SEPARATION AND RECOVERY METHOD AND FACILITY

CROSS REFERENCE TO RELATED APPLICATIONS

This is the U.S. National Phase application of PCT/JP2017/043776, filed Dec. 6, 2017, which claims priority to Japanese Patent Application No. 2017-007133, filed Jan. 19, 2017, the disclosures of these applications being incorporated herein by reference in their entireties for all purposes.

FIELD OF THE INVENTION

The present invention relates to a gas separation and recovery method based on pressure swing adsorption (PSA) technology, and to a facility suited for the implementation of the method.

BACKGROUND OF THE INVENTION

Pressure swing adsorption (PSA) is a technology conventionally used to separate a target gas component from a source gas (see, for example, Patent Literature 1). PSA utilizes the fact that gas components are adsorbed to an adsorbent in different amounts depending on gas species and partial pressures thereof. This separation process usually includes a step (adsorption step) in which gas components are caused to adsorb to an adsorbent, a step (rinse step) in which part of desorbed gas separated in other adsorbent vessel is supplied as rinse gas to let the adsorbent capture more of the gas, and a step (desorption step) in which the adsorbed gas components are desorbed from the adsorbent and are recovered. PSA processes have been applied in various fields and are frequently used to produce high-concentration gas by adsorbing a single species of gas components contained in a source gas. PSA is a pressurizing process in which gases are separated utilizing a difference between increased pressure and ambient pressure, or a vacuum process where gas separation makes use of a difference between ambient pressure (or slightly increased pressure) and reduced pressure. In the latter case, the process is also called VSA (vacuum swing adsorption).

PATENT LITERATURE

PTL. 1: Japanese Unexamined Patent Application Publication No. H06-144818

NON PATENT LITERATURE

NPL 1: N. Heymans et al., "Experimental and theoretical study of the adsorption of pure molecules and binary systems containing methane, carbon monoxide, carbon dioxide and nitrogen. Application to the syngas generation", Chemical Engineering Science 66 (2011) pp. 3850-38.58

NPL 2: A. Arefi Pour et al.; "Adsorption separation of $CO_2/CH_4$ on the synthesized NaA zeolite shaped with montmorillonite clay in natural gas purification process", Journal of Natural Gas Science and Engineering 36 (2016) pp. 630-643

SUMMARY OF THE INVENTION

PSA processes involve large amounts of electric power for gas separation. Thus, the saving of gas separation costs significantly depends on the reduction in power consumed by the PSA processes. In general, the major proportion of the power required for the gas separation process is represented by the power consumed by a gas compressor to increase the adsorption pressure in the adsorption step in the pressurizing PSA process, or by the power consumed by a vacuum pump in the desorption step in the vacuum PSA process. The amounts of power consumed by these equipment are increased with increasing volumes of gases that are adsorbed and desorbed.

If the PSA operation cycle consists solely of the adsorption step and the desorption step, the process generally consumes less power but results in a low concentration of the recovered gas. In the case where the process involves the rinse step in which part of desorbed gas is recycled as rinse gas to other adsorbent vessel, the concentration of the recovered gas can be increased. However, due to the fact that desorbed gas is adsorbed again to the adsorbent and is fed to the desorption step, the amount of the gas that is desorbed in the desorption step is increased and the amount of the power consumption is increased.

An object according to aspects of the present invention is therefore to provide a method and a facility which are capable of separating and recovering gases in a way that the problems in the art discussed above are solved and the target gas component can be separated from the source gas and recovered in an increased concentration without performing the rinse step, thereby lessening the amount of power consumption.

The present inventors have focused on the fact that a gas adsorbent generally has different adsorption and desorption characteristics depending on the affinities and pressures of gas species, and gases of different species are desorbed at different timings in the desorption step. The present inventors have then developed a novel gas separation and recovery method which can separate and recover the target gas component with a high concentration selectively by making use of such differences of desorption timings and by recovering desorbed gases in two or more divided time periods.

Specifically, a summary of aspects of the present invention which solves the aforementioned problems is as described below.

[1] A gas separation and recovery method for separating and recovering a target gas component from a source gas by pressure swing adsorption, including an adsorption step of causing gas components to adsorb to an adsorbent packed in an adsorbent vessel, and a desorption step of desorbing the gas components adsorbed to the adsorbent in the adsorption step and recovering the desorbed gases, wherein the method does not include a rinse step in which part of desorbed gas from other adsorbent vessel is supplied as a rinse gas, and the desorption step is divided into a plurality of time periods and the desorbed gases are recovered in the respective time periods.

[2] The gas separation and recovery method described in [1], wherein in the adsorption step, the source gas is introduced into the adsorbent vessel through a first end side of the adsorbent vessel, and an off-source gas is discharged through a second end side of the adsorbent vessel, and in the desorption step, the desorbed gases are discharged through the second end side of the adsorbent vessel.

[3] The gas separation and recovery method described in [1] or [2], wherein the adsorbent vessel is a vertical adsorbent vessel configured to pass the gases in a vertical direction, and the steps with the highest flow rate during operation are performed so that the flow of gas takes place in a downward direction.

[4] The gas separation and recovery method described in any one of [1] to [3], wherein the adsorbent vessel is connected to a pressure release valve for reducing the pressure inside the vessel, and the pressure release valve is opened to reduce the pressure inside the adsorbent vessel before the adsorbent vessel is evacuated with a vacuum pump in the desorption step.

[5] The gas separation and recovery method described in any one of [1] to [4], wherein the desorption step is performed in such a manner that the adsorbent vessel is evacuated with a vacuum pump to desorb a gas or gases in one or more time periods from the start of the step, and thereafter a purge gas is introduced into the adsorbent vessel to desorb a gas or gases without use of the vacuum pump in the subsequent time period or periods.

[6] The gas separation and recovery method described in any one of [1] to [5], wherein the desorption step is divided into a plurality of time periods so that a gas desorbed in a specific time period has a higher calorie than a gas or gases desorbed in other time period or periods, and the gas desorbed in the specific time period is recovered as a high-calorie gas.

[7] The gas separation and recovery method described in [6], wherein the source gas is a mixed gas including CO and $CO_2$, and the desorption step is divided into a plurality of time periods so that a gas desorbed in a specific time period has a higher CO concentration than a gas or gases desorbed in other time period or periods.

[8] A gas separation and recovery facility for separating and recovering a target gas component from a source gas by pressure swing adsorption, wherein the gas separation and recovery facility is configured to perform steps including an adsorption step of causing gas components to adsorb to an adsorbent packed in an adsorbent vessel, and a desorption step of desorbing the gas components adsorbed to the adsorbent in the adsorption step and recovering the desorbed gases, the steps not including a rinse step in which part of desorbed gas from other adsorbent vessel is supplied as a rinse gas, and wherein the gas separation and recovery facility includes a desorbed gas, outlet line forked into a plurality of branch lines, the branch lines each having an on-off valve, and allows the gases desorbed in the desorption step to be recovered separately through respective branch lines in different time periods.

[9] The gas separation and recovery facility described in [8], wherein the adsorbent vessel is configured so that in the adsorption step, the source gas is introduced into the adsorbent vessel through a first end side of the adsorbent vessel, and an off-source gas is discharged through a second end side of the adsorbent vessel, and the desorbed gas outlet line is arranged so that in the desorption step, the desorbed gases are discharged through the second end side of the adsorbent vessel.

[10] The gas separation and recovery facility described in [8] or [9], wherein the adsorbent vessel is a vertical adsorbent vessel configured to pass the gases in a vertical direction, and gas inlet and outlet lines are arranged to the adsorbent vessel so that the flow of gas takes place in a downward direction in the steps with the highest flow rate during operation.

[11] The gas Separation and recovery facility described in any one of [8] to [10], wherein the desorbed gas outlet line includes a vacuum pump for evacuating the adsorbent vessel, and the facility includes a pressure release valve for reducing the pressure inside the adsorbent vessel.

[12] The gas separation and recovery facility described in any one of [8] to [11], wherein the desorbed gas outlet line includes a vacuum pump for evacuating the adsorbent vessel, and the facility includes a purge gas introduction line for introducing a gas-desorbing purge gas into the adsorbent vessel.

According to aspects of the present invention, a gas can be recovered with an increased concentration without a rinse step. Thus, a target gas component can be separated and recovered in a high concentration with less power.

BRIEF DESCRIPTION OF THE DRAWINGS

FIG. 4-1 is a set of schematic diagrams illustrating some steps in another embodiment of a method and a facility for separating and recovering gases according to an aspect of the present invention.

FIG. 4-2 is a set of schematic diagrams illustrating other steps in the same embodiment as in FIG. 4-1.

DETAILED DESCRIPTION OF EMBODIMENTS OF THE INVENTION

A gas separation and recovery method according to aspects of the present invention can separate and recover a target gas component from a source gas by pressure swing adsorption. The method includes an adsorption step of causing gas components to adsorb to an adsorbent packed in an adsorbent vessel, and a desorption step of desorbing the gas components adsorbed to the adsorbent in the adsorption step and recovering the desorbed gases. The method does not include rinse step in which part of desorbed gas from other adsorbent vessel is supplied as a rinse gas. As already described, a concentration of recovery gas can be increased when a rinse step is performed, but the rinse step increases the amount of gas that is desorbed and consequently results in an increase in power consumption. In order to realize the recovery of high-concentration gas without performing a rinse step, aspects of the present invention divide the desorption step into a plurality of time periods, and recovers the desorbed gases in the respective time periods. A facility for implementing this method, is configured so that a desorbed gas outlet line is forked into a plurality of branch lines, the branch lines each having an on-off valve, and the gases desorbed in the desorption step are recovered separately through respective branch lines in different time periods.

Figure 2:
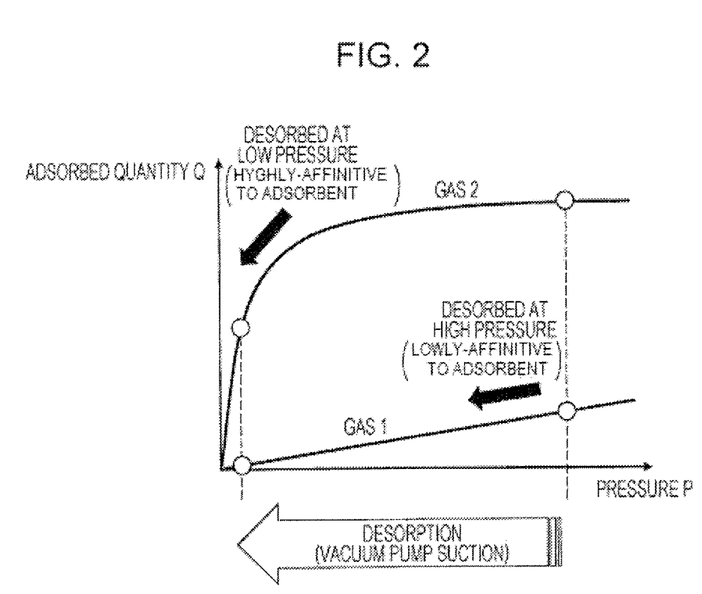
FIG. 2 is a graph illustrating adsorption and desorption characteristics, at various pressures, of two gas species having different affinities for an adsorbent.

FIG. 2 is a graph illustrating adsorption and desorption characteristics, at various pressures, of two gas species having different affinities to an adsorbent. For example, gas species such as $N_2$ and CO which are lowly-affinitive to 13× zeolite used as a $CO_2$ adsorbent show linear pressure-adsorption characteristics as is the case for gas 1 in FIG. 2.

On the other hand, highly-affinitive gas species such as $CO_2$ are adsorbed in large quantities and show nonlinear pressure-adsorption characteristics as in the case for gas 2 in FIG. 2. When an adsorbent having different pressure-adsorption or pressure-desorption characteristics for gas species depending on pressure is used, the gases are desorbed at different timings in the desorption step. That is, as illustrated in FIG. 2, gas 1 having linear pressure-adsorption characteristics is desorbed easily when the gas at a high pressure is depressurized, while gas 2 having nonlinear pressure-adsorption characteristics is hardly desorbed at high pressures and starts to be desorbed suddenly after the pressure is reduced to a low level.

Based on the above fact, the desorption step may be divided into, for example, two time periods in accordance with the difference in timing at which the gases are desorbed, and the desorbed gases may be recovered in the respective time periods. In this manner, a recovered gas rich in gas 1, and a recovered gas rich in gas 2 can be obtained separately. Aspects of the present invention thus enable increasing the concentration of recovered gas without performing a rinse step, and thereby realizes the selective separation and recovery of a target gas component with high concentration.

Figure 1:
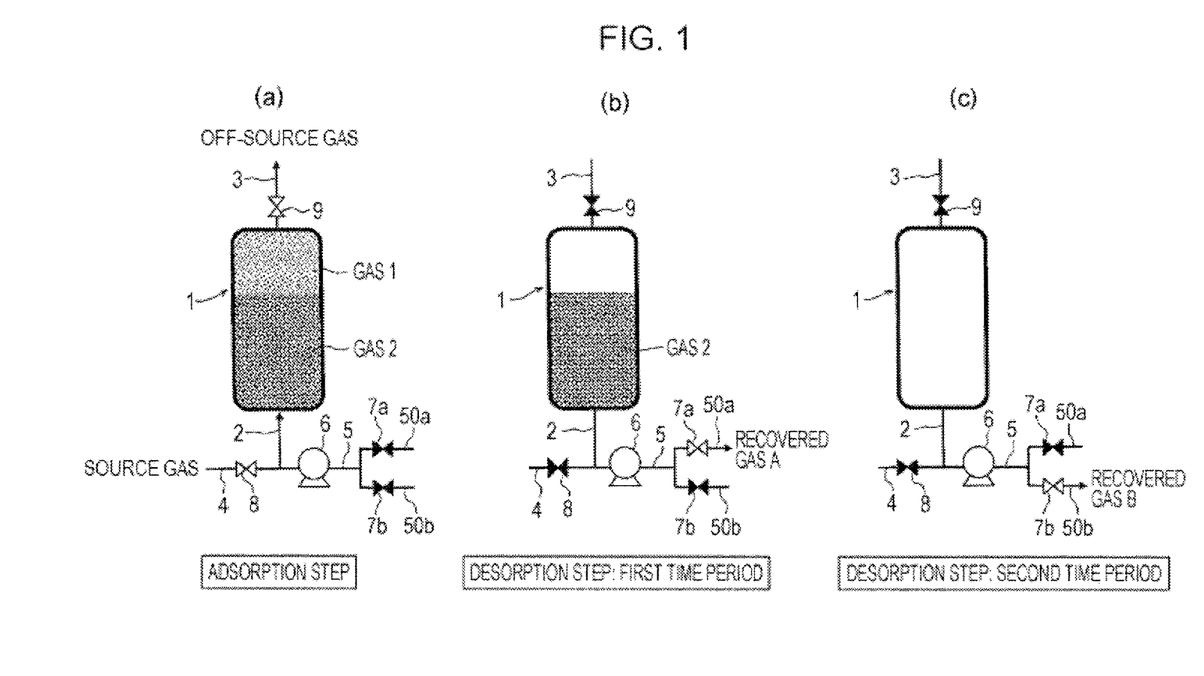
FIG. 1 is a set of schematic diagrams illustrating an embodiment of a method and a facility for separating and recovering gases according to an aspect of the present invention.

FIG. 1 is a set of schematic diagrams illustrating an embodiment of a gas separation and recovery method and a facility according to aspects of the present invention. In this embodiment, the desorption step is divided into the first time period and the second time period, and desorbed gases are recovered in the respective time periods. FIG. 1(a) illustrates "adsorption step", FIG. 1(b) "desorption step: first time period", and FIG. 1(c) "desorption step: second time period".

In the same way as in the case of gas 1 and gas 2 illustrated in FIG. 2, gas 1 in the following description is defined as a gas which has linear pressure-adsorption characteristics and is desorbed easily when the gas at a high pressure is depressurized, and gas 2 is defined as a gas which has nonlinear pressure-adsorption characteristics and which is hardly desorbed at high pressures and starts to be desorbed suddenly after the pressure is reduced to a low level. The same applies also to other embodiments illustrated in FIGS. 3 to 5.

In FIG. 1, an adsorbent vessel 1 is a vertical adsorbent vessel configured to pass gases in a vertical direction, and is filled with an adsorbent which shows different linearities of adsorption isotherms as illustrated in FIG. 2. An inlet-outlet pipe 2 for use of both the introduction of source gas and the release of desorbed gas is connected to the first end side (the lower end side) of the adsorbent vessel 1. An inlet pipe which defines source gas introduction line 4, and an outlet pipe which defines a desorbed gas outlet line 5 are connected to the inlet-outlet pipe 2. Further, an outlet pipe which defines an off-source gas outlet line 3 is connected to the second end side (the upper end side) of the adsorbent vessel 1.

The outlet line 5 is provided with a vacuum pump 6 and is forked into branch lines 50a and 50b downstream the vacuum pump 6 (on the pump discharged side). The branch lines 50a and 50b have respective on-off valves 7a and 7b (shut-off valves). In the drawing, numeral 8 indicates an on-off valve (a shut-off valve) disposed on the introduction line 4, and numeral 9 indicates an on-off valve (a shut-off valve) disposed on the outlet line 3.

Here, the on-off valves are open when shown as filled in white, and are closed when shown as filled-in black. The same applies to other embodiments illustrated in FIGS. 3 to 5.

In the adsorption step shown in FIG. 1(a), a source gas is introduced into the adsorbent vessel 1 through the introduction line 4, and an off-source gas is discharged through the outlet line 3. Next, without a rinse step being performed, the desorption step is performed by evacuating the adsorbent vessel 1 with the vacuum pump 6. In the first time period of the desorption step, as illustrated in FIG. 1(b), for the purpose of recovering gas 1, desorbed gas (recovered gas A) is recovered through the branch line 50a. Subsequently, in the second time period of the desorption step, as illustrated in FIG. 1(c), for the purpose of recovering gas 2, desorbed gas (recovered gas B) is recovered through the branch line 50b. To allow the desorbed gases to be recovered in the above manner, the on-off valves 7a and 7b are opened and closed appropriately (the same applying to the embodiments shown in FIGS. 3 to 5).

As described earlier, gas 1 has linear pressure-adsorption characteristics and is desorbed easily when the gas at a high pressure is depressurized, and gas 2 has nonlinear pressure-adsorption characteristics, and is hardly desorbed at high pressures and starts to be desorbed suddenly after the pressure is reduced to a low level. Thus, the recovered gas. A obtained in the first time period is rich in gas 1, and the recovered gas B obtained in the second time period is rich in gas 2. It is therefore possible to recover selectively the target gas component (for example, recovered gas A) with a high concentration.

Here, the first time period and the second time period may be divided in accordance with factors such as the adsorption and desorption characteristics of the adsorbent as shown in FIG. 2, and the desired concentration, calorie and desired yield of the target gas'component.

In general, as shown in FIG. 2, gas adsorbents offer adsorption and desorption characteristics (liniarities of adsorption isotherms) which differ depending on the affinities and pressures of gas species. Any such adsorbents may be used in accordance with aspects of the present invention. While the types of adsorbents are not particularly limited, some suitable adsorbents are 13× zeolite mentioned above, ZSM-5 zeolite and NaA zeolite. 13× zeolite shows different liniarities of adsorption isotherms particularly between CO2, and CO and $N_2$. ZSM-5 zeolite shows different liniarities of adsorption isotherms particularly between CO2 and CO (see, for example, FIG. 5 of Non Patent Literature 1), and NaA zeolite shows different linearities of adsorption isotherms particularly between $CO_2$ and $CH_4$ (see, for example, FIG. 7 of Non Patent Literature 2).

Because gas species showing different linearities of adsorption isotherms vary depending on the types of adsorbents, the adsorbent may be selected appropriately in accordance with the types of gas species to be separated.

Depending on the types of the adsorbents or the types of gas species to be separated and recovered, the desorption step, which in the present embodiment is divided into two time periods, may be divided into three or more time periods and desorbed gases may be recovered in the respective time periods.

Preferred embodiments of the present invention will be described below.

Figure 3:
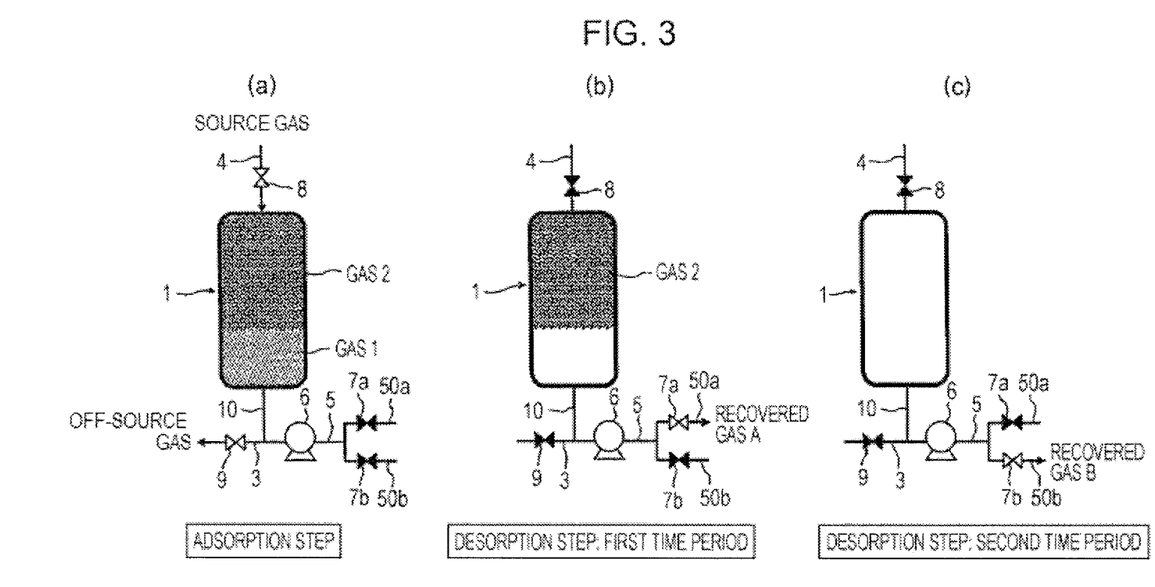
FIG. 3 is a set of schematic diagrams illustrating another embodiment of a method and a facility for separating and recovering gases according to an aspect of the present invention.

In the adsorption step, the source gas may be introduced into the adsorbent vessel through the first end side of the adsorbent vessel, and the off-source gas may be discharged through the second end side of the adsorbent vessel, and in the desorption step, the desorbed gases may be discharged through the second end side (opposite to the side where the source gas is introduced) of the adsorbent vessel. In this manner, the gas separation efficiency in accordance with aspects of the present invention may be enhanced. FIG. 3 is a set of schematic diagrams illustrating an embodiment of such a gas separation and recovery method and a facility according to aspects of the present invention. In this embodiment also, the desorption step is divided into the first time period and the second time period, and desorbed gases are recovered in the respective time periods. In FIG. 3, (a) illustrates "adsorption step", (b) "desorption step: first time period", and (c) "desorption step: second time period".

In FIG. 3, an adsorbent vessel 1 is a vertical adsorbent vessel configured to pass gases in a vertical direction, and is filled with an adsorbent for which gas species show different linearities of adsorption isotherms as illustrated in FIG. 2. An inlet pipe which defines a source gas introduction line 4 is connected to the first end side (the upper end side) of the adsorbent vessel 1. An outlet pipe 10 for the release of off-source gas and the release of desorbed gas is connected to the second end side (the lower end side) of the adsorbent vessel 1. An outlet pipe which defines an off-source gas outlet line 3, and an outlet pipe which defines a desorbed gas outlet line 5, are connected to the outlet pipe 10. The other members are similar to those in the embodiment shown in FIG. 1 and are indicated with the same reference numerals, and detailed description of such members will be omitted.

After the source gas has been introduced, the gases are adsorbed to the adsorbents inside the adsorbent vessel 1 in a distributed manner in which highly-affinitive gas 2 is adsorbed in the region near the source gas inlet and lowly-affinitive gas 1 is adsorbed in the region further from the source gas inlet. This quantitative distribution of adsorbed gases results from continuous changes in gas composition of the source gas flowing through the adsorbent vessel 1. In the adsorbent vessel 1 having such a quantitative distribution of adsorbed gases, if desorbed gases are discharged through the same side as the source gas inlet as in the embodiment of FIG. 1, the gases can be separated effectively by different timings at which the gases are desorbed. However, because the lowly-affinitive gas. 1 is desorbed first and passes through the region where the highly-affinitive gas 2 has been adsorbed, the partial pressure of gas 2 is reduced and gas 2 is partially desorbed, which causes a corresponding decrease in gas separation effects.

In view of this, the present embodiment is configured so that the desorbed gases are discharged through the side opposite to the source gas introduction side. According to this configuration, the desorption of gases starts from a state of quantitative distribution of adsorbed gases in the adsorbent vessel 1 illustrated in FIG. 3(a). Consequently, as illustrated in FIG. 3(b), lowly-affinitive gas 1 can be desorbed in the first time period without passing the region where the highly-affinitive gas 2 is adsorbed, and partial desorption of gas 2 is avoided. Thus, the gas separation efficiency is enhanced compared to the embodiment shown in FIG. 1.

In the adsorption step shown in FIG. 3(a) according to this embodiment also, the source gas is introduced into the adsorbent vessel 1 through the introduction line 4, and the off-source gas is discharged through the outlet pipe 10 and the outlet line 3. Next, without a rinse step being performed, the desorption step is performed by evacuating the adsorbent vessel 1 with the vacuum pump 6. In the first time period of the desorption step, as illustrated in FIG. 3(b), gas 1 is recovered as desorbed gas (recovered gas A) through the branch line 50a. Subsequently, in the second time period of the desorption step, as illustrated in FIG. 3(c), gas 2 is recovered as desorbed gas (recovered gas B) through the branch line 50b.

In accordance with aspects of the present invention, the degradation of the adsorbent due to fluidization can be suppressed by adopting a configuration where the adsorbent vessel is a vertical adsorbent vessel which passes the gases in a vertical direction as in the embodiment of FIG. 3, and the steps with the highest flow rate during operation are performed so that the flow of gas takes place in a downward direction. In this case, the gas inlet and outlet lines are arranged to the adsorbent vessel so that such a flow of gas will be realized.

Figure 41:
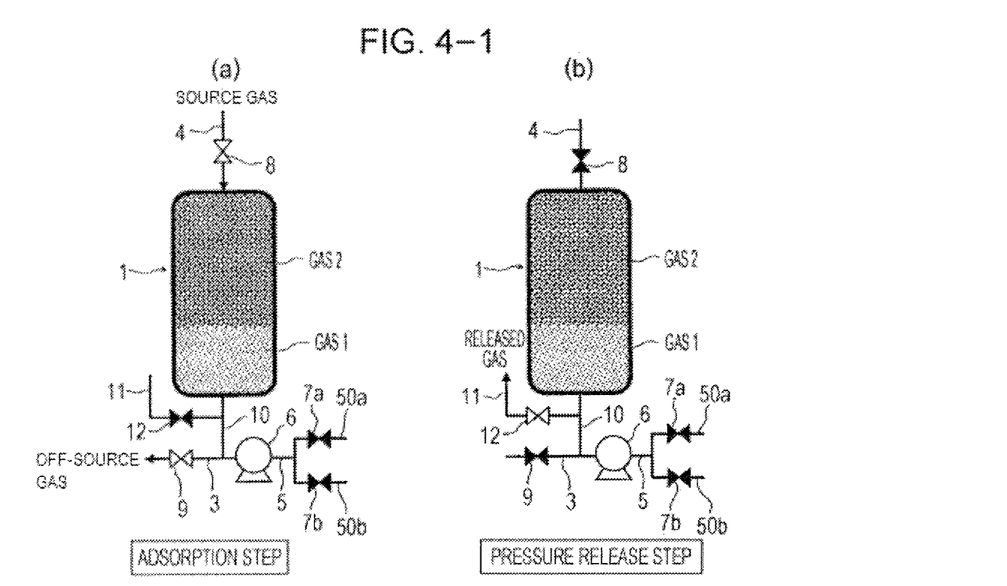

In view of the fact that aspects of the present invention make use of a quantitative distribution of adsorbed gas in the adsorbent vessel 1, it is preferable to use a vertical adsorbent vessel configured to pass the gases in a vertical direction. Provided that the amounts of an adsorbent are the same, the sectional area of the vertical adsorbent vessel is smaller than that of other types of vessels such as a horizontal adsorbent vessel. Thus, a vertical adsorbent vessel causes a gas to flow through the adsorbent bed at a higher flow rate. A gas flowing in the adsorbent vessel at a high flow rate may cause the adsorbent bed to fluidize and may accelerate the degradation of the adsorbent. For example, the gas flow rate of a vacuum PSA process becomes higher when the adsorption step is started (the introduction of the source gas is started) after evacuation of the adsorbent vessel 1. As another example, the gas flow rate in a pressurizing PSA becomes higher when the gas release (a pressure release step in FIG. 4(b) described later) is started after the adsorption step. Thus, when the process is operated using a vertical adsorbent vessel configured to pass the gases in a vertical direction as the adsorbent vessel 1 as shown in FIG. 3, and when the conditions of the operation are such that the gas flow rate becomes highest at the start of the adsorption step (at the start of the introduction of the source gas), the direction of the gas flow in that step is arranged to be downward. Such conditions of gas flow directions are satisfied in FIG. 3. The bottom of the adsorbent bed is supported by a metal mesh or the like which restrains the movement of the adsorbent. Thus, the adsorbent is hardly fluidized by a gas flowing in the downward direction, and can be prevented from degradation due to fluidization.

In accordance with aspects of the present invention, the adsorbent vessel may be connected to a pressure release valve for reducing the pressure inside the vessel, and the pressure release valve may be opened to reduce the pressure inside the adsorbent vessel before the adsorbent vessel is evacuated with the vacuum pump in the desorption step. In this manner, the desorption step may be partially performed without operating the vacuum pump, and the power that is needed for the gas separation may be saved.

Figure 42:
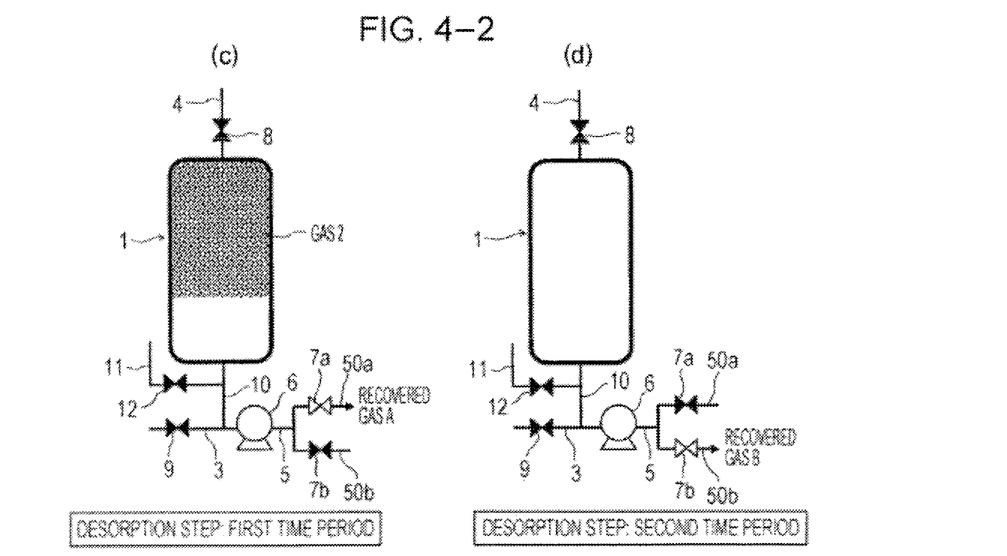

FIG. 4 is a set of schematic diagrams illustrating an embodiment of such a gas separation and recovery method and a facility according to an aspect of the present invention. FIG. 4 is a collection of FIG. 4-1 and FIG. 4-2. In this embodiment also, the desorption step is divided into the first time period and the second time period, and desorbed gases are recovered in the respective time periods. In FIG. 4, (a) illustrates "adsorption step", (b) "pressure release step", (c). "desorption step: first time period", and (d) "desorption step: second time period".

In FIG. 4, an adsorbent vessel 1 is a vertical adsorbent vessel configured to pass gases in a vertical direction, and is filled with an adsorbent for which gas species show different linearities of adsorption isotherms as illustrated in FIG. 2. Similarly to the embodiment illustrated in FIG. 3, an inlet pipe which defines a source gas introduction line 4 is connected to the first end side (the upper end side) of the adsorbent vessel 1. An outlet pipe 10 for the release of off-source gas and the release of desorbed gas is connected to the second end side (the lower end side) of the adsorbent vessel 1. An outlet pipe which defines an off-source gas outlet line 3, an outlet pipe which defines a desorbed gas outlet line 5, and further a release pipe 11 having a pressure release valve 12 are connected to the outlet pipe 10. The other members are similar to those in the embodiments shown in FIGS. 1 and 3, and are indicated with the same reference numerals, and detailed description of such members will be omitted.

In the embodiments shown in FIGS. 1 and 3, the desorption step is performed by evacuating the adsorbent vessel 1 with the vacuum pump, and the evacuation rate is controlled during the step by the controlling of the vacuum pump. When the gas adsorption pressure after the adsorption step is sufficiently high, the vessel can be depressurized by simple pressure release without evacuation with the vacuum pump. That is, as illustrated in FIG. 4, a pressure release step (FIG. 4(*b*)) is performed between the adsorption step (FIG. 4(*a*)) and the desorption step (FIG. 4(*c*)), and the desorption step is performed after the pressure inside the adsorbent vessel 1 is reduced.

In the adsorption step shown in FIG. 4(*a*) according to this embodiment also, the source gas is introduced into the adsorbent vessel 1 through the introduction line 4, and the off-source gas is discharged through the outlet pipe 10 and the outlet line 3. After the completion of the adsorption step, without a rinse step being performed, the pressure release valve 12 is opened as illustrated in FIG. 4(*b*) to reduce the pressure inside the adsorbent vessel 1 (pressure release step). After the completion of the pressure release step, the pressure release valve 12 is closed, and the desorption step is performed by evacuating the adsorbent vessel 1 with the vacuum pump 6. Specifically, gas 1 is recovered as desorbed gas (recovered gas A) through the branch line 50*a* as illustrated in FIG. 4(*c*) in the first time period of the desorption step, and, in the subsequent second time period of the desorption step, gas 2 is recovered as desorbed gas (recovered gas B) through the branch line 50*b* as illustrated in FIG. 4(*d*).

Incidentally, the pressure-released gas in the pressure release step has a relatively high concentration of gas 1, although lower than the gas 1 concentration in the recovered gas A, and thus may be recovered and used for specific applications.

In accordance with aspects of the present invention, the desorption step may be performed in such a manner that the adsorbent vessel is evacuated with the vacuum pump to desorb a gas or gases in one or more time periods from the start of the step, and thereafter a purge gas is introduced into the adsorbent vessel to desorb a gas or gases without use of the vacuum pump in the subsequent time period or periods. In this case, a purge gas introduction line for introducing the gas-desorbing purge gas into the adsorbent vessel is provided.

When the objective of this process is the high-concentration recovery of both of the lowly-affinitive gas 1 and the highly-affinitive gas 2, the gases need to be desorbed exclusively by vacuum pumping. When, for example, gas 2 can be released as harmless impurity gas, gas 2 may be desorbed by passing a purge gas without use of the vacuum pump and may be discharged together with the purge gas. In this manner, the highly-affinitive gas 2 may be desorbed without the need of operating the vacuum pump, and the power required for the gas separation can be significantly saved.

The purge gas is usually nitrogen, but is not limited thereto.

Figure 5:
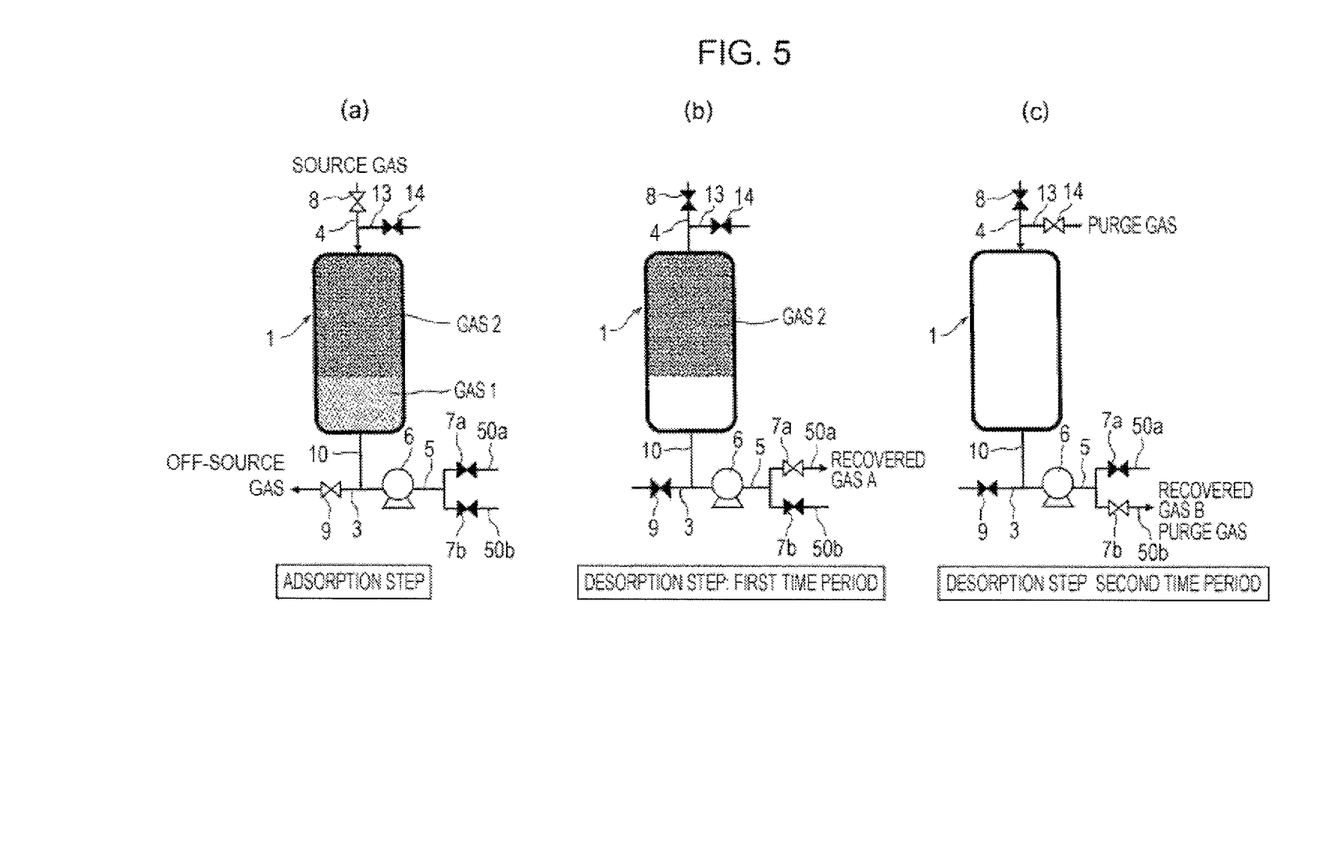
FIG. 5 is a set of schematic diagrams illustrating another embodiment of a method and a facility for separating and recovering gases according to an aspect of the present invention.

FIG. 5 is a set of schematic diagrams illustrating an embodiment of such a gas separation and recovery method and a facility according to an aspect of the present invention. In this embodiment also, the desorption step is divided into the first time period and the second time period, and desorbed gases are recovered in the respective time periods. FIG. 5(*a*) illustrates "adsorption step", FIG. 5(*b*) "desorption step: first time period", and FIG. 5(*c*) "desorption step: second time period".

In FIG. 5, an adsorbent vessel 1 is a vertical adsorbent vessel configured to pass gases in a vertical direction, and is filled with an adsorbent for which gas species show different linearities of adsorption isotherms as illustrated in FIG. 2. Similarly to the embodiment illustrated in FIG. 3, an inlet pipe which defines a source gas introduction line 4 is connected to the first end side (the upper end side) of the adsorbent vessel 1. An inlet pipe 13 for the introduction of purge gas is connected to a portion of the introduction line 4 between an on-off valve 8 on the introduction line and the adsorbent vessel 1. The inlet pipe 13 has an on-off valve 14 (a shut-off valve). Further, an outlet pipe 10 for the release of off-source gas and the release of desorbed gas is connected to the second end side (the lower end side) of the adsorbent vessel 1. An outlet pipe which defines an off-source gas outlet line 3, and an outlet pipe which defines a desorbed gas outlet line 5 are connected to the outlet pipe 10. The other members are similar to those in the embodiments shown in FIGS. 1 and 3, and are indicated with the same reference numerals, and detailed description of such members will be omitted.

In the adsorption step shown in FIG. 5(*a*) according to this embodiment also, the source gas is introduced into the adsorbent vessel 1 through the introduction line 4, and the off-source gas is discharged through the outlet pipe 10 and the outlet line 3. Next, without a rinse step being performed, the desorption step is performed. In the first time period of the desorption step, the adsorbent vessel 1 is evacuated with the vacuum pump 6 to recover gas 1 as desorbed gas (recovered gas A) through the branch line 50*a* as illustrated in FIG. 5(*b*). In the second time period of the desorption step, as illustrated in FIG. 5(*c*), for the purpose of recovering gas 2, the on-off valve 14 is opened to introduce a purge gas into the adsorbent vessel 1 through the inlet pipe 13, and gas is desorbed with the purge gas and the desorbed gas (recovered gas B) is recovered together with the purge gas through the branch line 50*b*. The mixed gas of the recovered gas B and the purge gas may be released to the air, or may be used as a gas rich in gas 2 for specific applications.

The mixed gas used as the source gas in accordance with aspects of the present invention is not particularly limited as long as it is composed of at least two gas components. Examples thereof in steelmaking processes include coke-oven gases and converter gases.

According to aspects of the present invention, a target gas component may be separated and recovered from a source gas for various purposes. When a high-calorie gas is to be separated and recovered from a source gas, the desorption step may be divided into a plurality of time periods so that a gas desorbed in a specific time period has a higher calorie than a gas or gases desorbed in other time period or periods, and the gas desorbed in the specific time period is recovered as a high-calorie gas. Thus, for example, when the source gas is a mixed gas including CO and CO2, the desorption step may be divided into a plurality of time periods so that a gas desorbed in a specific time period has a higher CO concentration than a gas or gases desorbed in other time period or periods, and the gas desorbed in the specific time period is recovered as a high-calorie gas.

It is needless to mention that the method according to aspects of the present invention is applicable not only to the separation and recovery of high-calorie gases, but also to Other separation and recovery processes such as separation of a mixed gas of two or more species of low-calorie gases (non-combustible gases) as a source gas.

EXAMPLES

Figure 6:
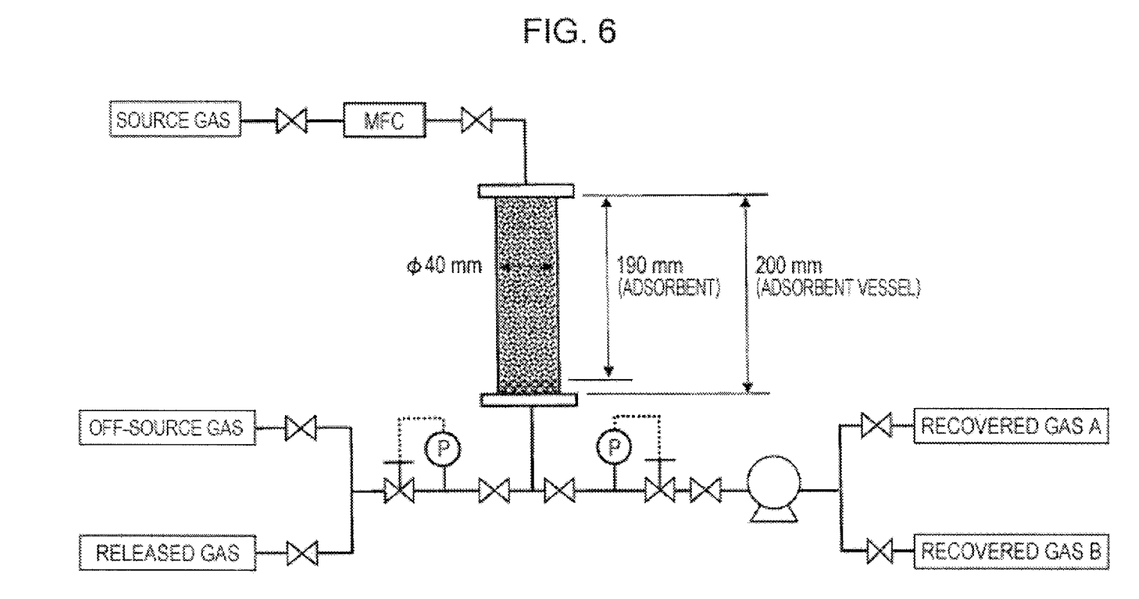
FIG. 6 is a schematic diagrams illustrating a PSA experimental apparatus used in Examples.

Experiment to demonstrate the gas separation effects according to aspects of the present invention was carried out using a PSA experimental apparatus illustrated in FIG. 6 which had an adsorbent vessel 40 mm in inner diameter and 200 mm in height (190 mm in height of adsorbent bed). Commercially available 13× zeolite was used as the adsorbent. The testing conditions were adsorption pressure of 50 kPaG, desorption pressure of −95 kPaG, and cycle time of 351 seconds. The source gas was a mixed gas with a gas composition of 49 vol % $N_2$, 22 vol % $CO_2$, 24 vol % CO and 5 vol % $H_2$. The flow rate of the source gas supplied to the adsorbent vessel was controlled to 3 L/min with a mass flow controller (MFC).

In accordance with the embodiment shown in FIG. 4, the adsorption step, the pressure release step and the desorption step were performed sequentially. In the desorption step, recovered gas A was recovered in the first time period, and recovered gas B was recovered in the second time period. The amounts of time in the respective steps were adsorption step $t_1$: 243 sec, pressure release step $t_2$: 6 sec, first time period $t_3$ in desorption step: 5 sec, and second time period $t_4$ in desorption step: 97 sec. The off-source gas, the pressure-released gas, the recovered gas A and the recovered gas B collected in the respective steps were analyzed for composition by gas chromatography. Table 1 describes the results of composition analysis of the source gas and the collected gases.

13× zeolite used as the adsorbent in this experiment is highly adsorptive to $CO_2$, and therefore the composition of the off-source gas from the adsorption step (the changes in composition from that of the source gas) ds mainly the result of $CO_2$ adsorption. In the recovered gas A, CO which is lowly-affinitive to the adsorbent than $CO_2$ was concentrated to 41.7 vol %. In the recovered gas B, highly-affinitive $CO_2$ was concentrated to 99.0 vol %. The gas separation effects of aspects of the present invention were thus demonstrated. In the pressure-released gas, CO was concentrated to 32.3 vol %, which although was lower than the concentration in the recovered gas A, and the content of $CO_2$ was small. Thus, the pressure-released gas may also be used as a CO gas.

TABLE 1

|  | Gas composition (vol %) | | | |
| --- | --- | --- | --- | --- |
|  | $N_2$ | CO | $CO_2$ | $H_2$ |
| Source gas | 49.1 | 24.1 | 21.8 | 5.1 |
| Off-source gas | 62.8 | 26.9 | 4.1 | 6.2 |
| Pressure-released gas | 58.8 | 32.3 | 4.8 | 4.2 |
| Recovered gas A | 44.6 | 41.7 | 12.8 | 0.9 |
| Recovered gas B | 0.2 | 0.8 | 99.0 | 0.0 |

REFERENCE SIGNS LIST

1 ADSORBENT VESSEL
2 INLET-OUTLET PIPE
3 OUTLET LINE
4 INTRODUCTION LINE
5 OUTLET LINE
6 VACUUM PUMP
7a, 7b ON-OFF VALVES
8 ON-OFF VALVE
9 ON-OFF VALVE
10 OUTLET PIPE
11 RELEASE PIPE
12 PRESSURE RELEASE VALVE
13 INLET PIPE
14 ON-OFF VALVE
50a, 50b BRANCH LINES

The invention claimed is:

1. A gas separation and recovery method for separating and recovering a target gas component from a source gas by pressure swing adsorption, comprising:
an adsorption step of causing gas components to adsorb to an adsorbent packed in an adsorbent vessel, and
a desorption step of desorbing the gas components adsorbed to the adsorbent in the adsorption step and recovering the desorbed gases using a desorbed gas outlet line forked into a plurality of branch lines, the branch lines each having an on-off valve, wherein
the method does not include a rinse step in which part of desorbed gas from an other adsorbent vessel is supplied as a rinse gas, and
the desorption step is divided into a plurality of different time periods and the desorbed gases are recovered separately through respective branch lines in the different respective time periods.

2. The gas separation and recovery method according to claim 1, wherein in the adsorption step, the source gas is introduced into the adsorbent vessel through a first end side of the adsorbent vessel, and an off-source gas is discharged through a second end side of the adsorbent vessel, and
in the desorption step, the desorbed gases are discharged through the second end side of the adsorbent vessel.

3. The gas separation and recovery method according to claim 1, wherein the adsorbent vessel is a vertical adsorbent vessel configured to pass the gases in a vertical direction, and steps with a highest flow rate during operation are performed so that the flow of gas takes place in a downward direction.

4. The gas separation and recovery method according to claim 2, wherein the adsorbent vessel is a vertical adsorbent vessel configured to pass the gases in a vertical direction, and steps with a highest flow rate during operation are performed so that the flow of gas takes place in a downward direction.

5. The gas separation and recovery method according to claim 1, wherein the adsorbent vessel is connected to a pressure release valve for reducing the pressure inside the vessel, and
the pressure release valve is opened to reduce the pressure inside the adsorbent vessel before the adsorbent vessel is evacuated with a vacuum pump in the desorption step.

6. The gas separation and recovery method according to claim 2, wherein the adsorbent vessel is connected to a pressure release valve for reducing the pressure inside the vessel, and the pressure release valve is opened to reduce the pressure inside the adsorbent vessel before the adsorbent vessel is evacuated with a vacuum pump in the desorption step.

7. The gas separation and recovery method according to claim 3, wherein the adsorbent vessel is connected to a pressure release valve for reducing the pressure inside the vessel, and the pressure release valve is opened to reduce the pressure inside the adsorbent vessel before the adsorbent vessel is evacuated with a vacuum pump in the desorption step.

8. The gas separation and recovery method according to claim 1, wherein the desorption step is performed in such a manner that the adsorbent vessel is evacuated with a vacuum pump to desorb a gas or gases in one or more time periods from the start of the step, and thereafter a purge gas is introduced into the adsorbent vessel to desorb a gas or gases without use of the vacuum pump in thea subsequent time period or periods.

9. The gas separation and recovery method according to claim 1, wherein the desorption step is divided into a plurality of time periods so that a gas desorbed in a specific time period has a higher calorie than a gas or gases desorbed in other time period or periods, and the gas desorbed in the specific time period is recovered as a high-calorie gas.

10. The gas separation and recovery method according to claim 9, wherein the source gas is a mixed gas including CO and $CO_2$, and the desorption step is divided into a plurality of time periods so that a gas desorbed in a specific time period has a higher CO concentration than a gas or gases desorbed in other time period or periods.

11. A gas separation and recovery facility for separating and recovering a target gas component from a source gas by pressure swing adsorption, wherein the gas separation and recovery facility is configured to perform steps comprising:

an adsorption step of causing gas components to adsorb to an adsorbent packed in an adsorbent vessel, and a desorption step of desorbing the gas components adsorbed to the adsorbent in the adsorption step and recovering the desorbed gases, the steps not including a rinse step in which part of desorbed gas from an other adsorbent vessel is supplied as a rinse gas, and wherein the desorption step is divided into a plurality of different time periods, and the gas separation and recovery facility comprises a desorbed gas outlet line forked into a plurality of branch lines, the branch lines each having an on-off valve, and allows the gases desorbed in the desorption step to be recovered separately through respective branch lines in the different time periods.

12. The gas separation and recovery facility according to claim 11, wherein the adsorbent vessel is configured so that in the adsorption step, the source gas is introduced into the adsorbent vessel through a first end side of the adsorbent vessel, and an off-source gas is discharged through a second end side of the adsorbent vessel, and the desorbed gas outlet line is arranged so that in the desorption step, the desorbed gases are discharged through the second end side of the adsorbent vessel.

13. The gas separation and recovery facility according to claim 11, wherein the adsorbent vessel is a vertical adsorbent vessel configured to pass the gases in a vertical direction, and gas inlet and outlet lines are arranged to the adsorbent vessel so that the flow of gas takes place in a downward direction in the steps with the highest flow rate during operation.

14. The gas separation and recovery facility according to claim 12, wherein the adsorbent vessel is a vertical adsorbent vessel configured to pass the gases in a vertical direction, and gas inlet and outlet lines are arranged to the adsorbent vessel so that the flow of gas takes place in a downward direction in the steps with the highest flow rate during operation.

15. The gas separation and recovery facility according to claim 11, wherein the desorbed gas outlet line includes a vacuum pump for evacuating the adsorbent vessel, and the facility comprises a pressure release valve for reducing the pressure inside the adsorbent vessel.

16. The gas separation and recovery facility according to claim 12, wherein the desorbed gas outlet line includes a vacuum pump for evacuating the adsorbent vessel, and the facility comprises a pressure release valve for reducing the pressure inside the adsorbent vessel.

17. The gas separation and recovery facility according to claim 13, wherein the desorbed gas outlet line includes a vacuum pump for evacuating the adsorbent vessel, and the facility comprises a pressure release valve for reducing the pressure inside the adsorbent vessel.

18. The gas separation and recovery facility according to claim 14, wherein the desorbed gas outlet line includes a vacuum pump for evacuating the adsorbent vessel, and the facility comprises a pressure release valve for reducing the pressure inside the adsorbent vessel.

19. The gas separation and recovery facility according to claim 11, wherein the desorbed gas outlet line includes a vacuum pump for evacuating the adsorbent vessel, and the facility comprises a purge gas introduction line for introducing a gas-desorbing purge gas into the adsorbent vessel.

* * * * *